United States Patent [19]

Schneider

[11] 4,399,710

[45] Aug. 23, 1983

[54] METHOD OF AND DEVICE FOR THE REMOVAL OF BURDEN SAMPLES

[75] Inventor: Werner Schneider, Siegen, Fed. Rep. of Germany

[73] Assignee: Dango & Dienenthal Maschinenbau GmbH, Siegen, Fed. Rep. of Germany

[21] Appl. No.: 292,240

[22] Filed: Aug. 12, 1981

[30] Foreign Application Priority Data

Oct. 3, 1980 [DE] Fed. Rep. of Germany ....... 3037400

[51] Int. Cl.³ ............................................ G01N 1/08

[52] U.S. Cl. ............................... 73/863.83; 73/863.85

[58] Field of Search ........... 73/863.31, 863.83, 863.85, 73/864.51, 864.64

[56] References Cited

U.S. PATENT DOCUMENTS 3,643,508 2/1972 Schneider ........................ 73/863.83

*Primary Examiner*—S. Clement Swisher

*Attorney, Agent, or Firm*—Toren, McGeady and Stanger

[57] ABSTRACT

To remove burden samples from a furnace shaft, a tubular lance containing a sampler displaceable relative to the lance, is inserted into the shaft so that the inner end of the lance is spaced at a maximum distance inwardly from the inside surface of the shaft. The lance is withdrawn from the shaft relative to the sampler and the sampler takes samples representative of a cross-section of the furnace burden between the point of maximum distance inwardly from the shaft to the inside surface of the shaft.

6 Claims, 6 Drawing Figures

METHOD OF AND DEVICE FOR THE REMOVAL OF BURDEN SAMPLES

SUMMARY OF THE INVENTION

The present invention is directed to a method of and a device for the removal of burden samples from a blast furnace shaft.

It is known to insert a tubular lance from the outside into a blast furnace shaft through a wall opening into the burden. With the aid of a handwheel located on a shaft extending through the lance, the lance is rotated and an eccentrically arranged trough-shaped trap on it is filled with a sample of the burden. After sampling the burden, the lance is withdrawn, the opening in the furnace shaft is closed and the trough containing the sample is emptied.

In another known device, a central opening is provided in the point or end of the tubular lance so that a small pan can move inwardly and outwardly relative to the lance point. In this arrangement, the lance is driven in and out of the burden by a separate drive with controllable speed. The sample pan can be pushed out of the lance point at a measuring position so that the burden falls into the pan. Following the sampling operation, the pan is retracted into the lance and the entire device is withdrawn out of the blast furnace shaft so that the burden sample can be removed from the lance outside of the blast furnace shaft when the opening in the shaft wall has been closed.

These known methods and devices have the disadvantage that it is possible to remove a sample only at a limited location. If a number of samples from different locations in the blast furnace shaft are needed, such a sampling operation can be performed only over a relatively long time period, since the lance must be inserted and then withdrawn from the blast furnace each time a sample is taken. Due to the pressure within the blast furnace, the lance opening in the furnace shaft must be closed tightly during each sampling operation. Between two sampling operations, the burden in the furnace sinks considerably downwardly due to the normal furnace operation so that the next sample is taken from a different layer of the furnace burden. As a result, it is not possible to obtain exact burden profiles with the known devices.

Therefore, it is the primary object of the present invention to provide a method of and a device for sampling the burden in a shaft furnace, preferably a blast furnace so that an exact cross-sectional representation of the burden distribution and composition at a specific point in time or at a specific furnace level can be obtained. During such measurements, if the entire furnace cross-section is not sampled, then approximately the furnace radius is sampled without interfering with the sampling from the different regions in the range of the measurements taken. In addition, it is possible to retain the lance inside the blast furnace shaft wall during the removal of the burden sample.

In accordance with the present invention, a tubular lance with a sampler located within it, is driven into the furnace burden to a sampling position which is spaced the maximum distance inwardly from the shaft wall. Preferably, the lance is driven radially inwardly into the furnace shaft. The position spaced the maximum distance from the inside surface of the shaft is usually the axial center of the shaft. After the sampling position has been reached, the lance and sampler are withdrawn. The withdrawal of the sampling device may take place continuously, and/or in two steps or in more than two steps.

In the two-step method, the lance containing the sampler within its interior is pushed into the burden so that the point or end of the lance is positioned at the center line of the furnace shaft. When this position has been reached, the position of the sampler is maintained within the furnace, however, the lance is withdrawn until its point is approximately at the furnace wall. As the lance is withdrawn, the sampler is increasingly exposed starting from its point so that the burden fills the sampler over its axial length until the lance point reaches the shaft wall and is, consequently , in a rest position. With this movement of the lance relative to the sampler, the sampler is filled with the burden and is withdrawn or pulled into the lance which is in the rest position, and the sampler can be completely removed while the lance remains in the rest position. As an alternative, the lance and the sampler can be pulled as a unit from the furnace or its shaft wall. In this way, a sample is obtained providing a representation of the burden composition extending over the radius of the furnace at a given level.

In most instances, it is desirable to construct the platform on which the lance and sampler is supported so that the platform is as short as possible. This is possible, however, only when the sampler is shorter than the range of measurement. This feature is possible using the two-step method when the lance with the sampler is inserted so that its leading end or point is located at the center line of the furnace shaft. During the subsequent retraction of the tubular lance up to the shaft wall, the sampler does not remain at rest, rather it is retracted at a smaller speed than the lance so that there is a relative movement between the two parts. During this withdrawal procedure, the sampler is exposed to the burden starting at the center point and is accessible to remove samples. The length of the sampler exposed to the burden results in the difference in speed between the two parts. If, for instance, the speed of the sampler is half of the speed of the tubular lance, then the length of the sampler needs to be only one-half of the length being measured without changing the cross-sectional profile of the sample. In this method, the bending stresses on the sampler is reduced which is particularly advantageous in large blast furnaces where the measuring distance corresponds to the diameter of the furnace.

In a multi-step method, the lance is moved relative to the sampler only a short distance from the starting sampling position. During this movement of the lance relative to the sampler, the sampler is at rest and an appropriate portion of the sampler is exposed and filled with the burden. Next, the sampler is pulled out of the lance which remains in the at-rest position, the sampler is emptied and is reinserted into the tubular lance so that its point reaches the point of the lance. Again, while the sampler is held in the at-rest position, the lance is pulled back again by a short distance with the sampler being filled with the burden and then the sampler is withdrawn and emptied in the same manner as above. This sampling operation is repeated until the lance point reaches the shaft wall and the last sample is withdrawn. In this operation, a series of individual samples is obtained which provides a very accurate indication of the composition of the burden over the radius of the furnace, because the time interval between the taking of the first and last samples is very short and the furnace burden sinks only a relatively small distance during such a period.

Of course a total sample or several individual samples can be taken across the furnace diameter with a tubular lance of an appropriate length in the same manner as samples are taken across the radius of the furnace.

The method of the present invention can be carried out using a tubular lance containing a slidable sampler, such as a sampling trough. In another arrangement, the sampler may be in the form of a slidable rod with transverse grooves. With such a construction, individual samples are taken one after the other over the length of the slidable sampling rod and the analysis values of these samples need only be coordinated to the sample position of the rod to show the burden composition, such as along the radius of the furnace.

In another arrangement, the sampler can be in the form of a feed screw which withdraws a sample corresponding to its length outside the lance and the feed screw can be operated continuously or intermittently. The length of the feed screw projecting outwardly from the lance is determined by the desired accuracy of measurement. The shorter the length of the feed screw projecting from the lance, the more accurate will be the measured result.

In this arrangement, the lance and the sampler feed screw can be pulled together as a unit out of the furnace shaft or through the burden without any relative movement between the two parts. The feed screw can deliver a continuous sample corresponding to the speed of movement within the burden, for instance over the length of the shaft radius, it scratches or scrapes out the sample from the burden as it provides a continuous sample. As an alternative, the lance and the feeding screw can be pulled successively independently from one another in several steps out of the furnace shaft, so that a rapid series of individual samples is taken with the number of individual samples corresponding to the number of steps in the withdrawal movement.

To assure that the tubular lance which is open at its free or leading end, easily penetrates into the furnace burden, the free or leading end of the sampler is preferably constructed as a lance point.

Regardless of the method of operation and of the construction of the sampler, the lance remains in the furnace shaft or in the receiving furnace opening until the last sample is withdrawn. As a result, there is a high accuracy in the measured results for short measuring periods affording a profile of the characteristics and composition of the burden with an accuracy being selected to any desired degree. The sampler can be of a relatively simple construction, since it is in a protected position within the lance during the insertion of the lance into the burden. In such an arrangement the sampler is hardly subjected to any stress. It is only when the sampler comes in contact with the burden and the gases in the furnace that it is exposed to stresses. The period when the sampler is exposed is only a fraction of the time involved in the entire measuring operation and, further, the sampler is not subjected to any significant buckling stresses because, contrary to the conventional known devices, the sampler is only pulled out of the burden.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAIL DESCRIPTION OF THE INVENTION

Figure 1:
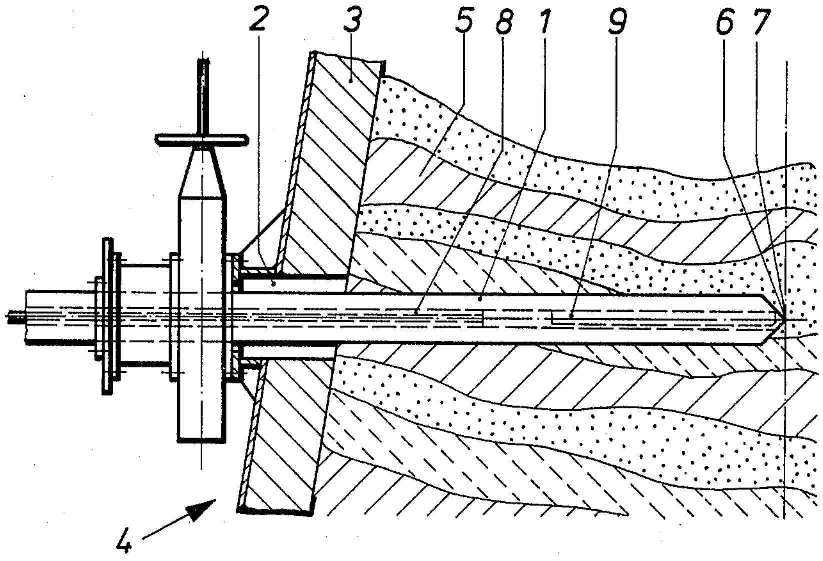
FIG. 1 is a cross-sectional view through an axially extending portion of a blast furnace shaft illustrating the sampling arrangement of the present invention.

In FIG. 1 a lance 1 is shown projecting inwardly through an opening 2 in the wall 3 of a blast furnace shaft 4 with the lance extending into the furnace burden 5. The lance 1 penetrates through the burden at a given level and its inner or leading end or point 6 is located in a measuring position 7 located at the center of the blast furnace shaft, that is, at a position which is spaced the maximum distance inwardly from the inside surface of the shaft. As can be seen best in FIG. 2, a sampling trough 9 is located within the bore 8 formed by the tubular lance and the trough can be moved axially independently of the lance.

Figure 2:
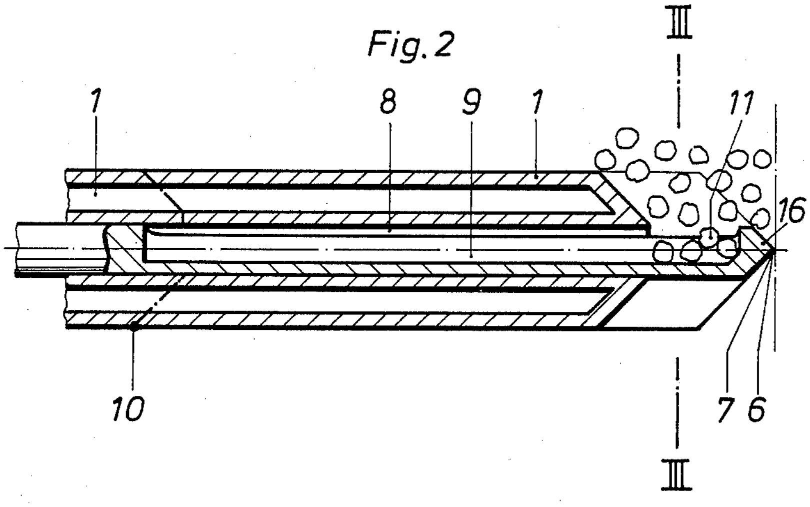
FIG. 2 is a cross-sectional view of the sampling device illustrated in FIG. 1.

As illustrated in FIG. 2, the lance 1 can be retracted relative to the sampling trough 9 so that the trough remains in the position 7 and a sample of the burden drops into the trough which is open at the top. As soon as the lance point or leading end of the tubular lance reaches the position 10, the movement of the lance is stopped and the sampling trough 9, now filled with a burden sample 11, is retracted into the lance 1. Position 10 is determined with respect to the sampling trough 9 as approximately the last effective end position for sample removal. Position 10 is also selected with respect to the blast furnace shaft 4 so that the distance between position 7 and 10 represent the length of the sampling operation. Preferably, position 10 is located approximately at the inside of the shaft wall 3. As compared to the sampling trough of FIG. 2, or the feed screw 12 of FIG. 5 or the slide rod 13 of FIG. 4, the lance 1 is especially resistant to the high thermal, chemical and mechanical stresses in a blast furnace. The sampler is comparatively light and uncomplicated relative to the tubular lance and this difference is possible because the sampler is not pushed into the burden as was done in the past, rather it is completely protected by the tubular lance 1 as it is forced forwardly into the burden. When the sampler is drawn back into the lance, significantly smaller stresses occur then compared to those which develop when the device is forced into the burden.

Figure 3:
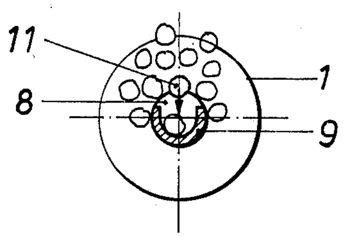
FIG. 3 is a sectional view taken along the line III—III in FIG. 2.
Figure 6:
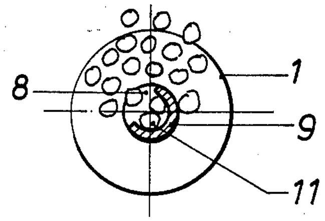
FIG. 6 is a sectional view, similar to FIG. 3, however, taken through a lance point end of another sampling device.
Figure 5:
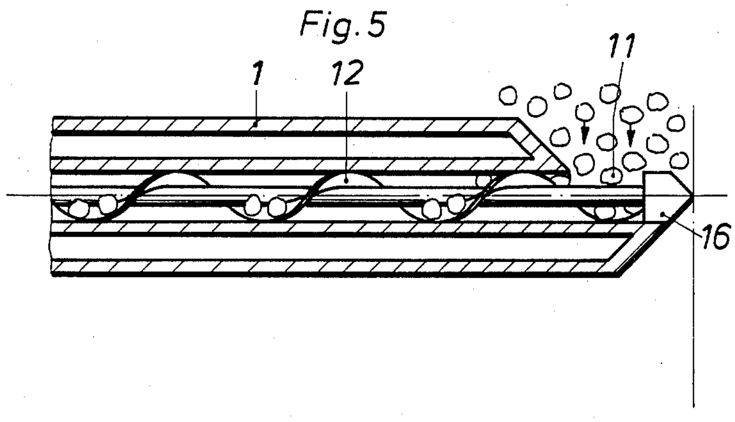
FIG. 5 is another embodiment of the device illustrated in FIG. 2 with the sampler in the form of a feed screw.

As shown in FIG. 3, the sampling trough 9 is a tubular member which is slotted in the longitudinal or axial direction so that it is open at the top. When a feed screw 12 is used as the sampler, as is known per se and is shown in FIG. 5, the commencement of the sampling operation occurs only when the lance 1 together with the feed screw 12 has reached the sampling position 7 which is furthest removed from the shaft wall. When the sampling operation starts, the feed screw which is at the rest position during insertion, projects a sufficient distance out of the end of the lance into the burden so that samples can be taken. During the reverse or withdrawal movement of the lance 1, the feed screw 12 rotates and continuously delivers burden samples 11 into the lance. From the outset of the taking of burden samples, the feed screw can be withdrawn along with the lance 1 until position 10 is reached. At this position, the feed screw 12 is fully retracted into the lance 1. Accordingly, burden samples can be taken first from the center of the blast furnace shaft with additional samples being taken successively up to the inside of the shaft wall 3. As a result, in a short time period samples are collected which afford a very exact horizontal composition profile of the burden.

Figure 4:
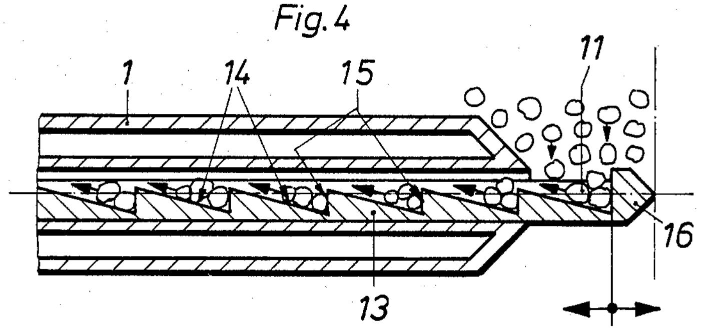
FIG. 4 is a cross-sectional view of the device of the present invention showing another embodiment with the sampler in the form of a slide rod.

If a slide rod 13, as shown in FIG. 4, is used as the sampler instead of the feed screw, the method of operation is essentially the same, however, the removal of the samples is effected by a jerky-reciprocating motion of the slide rod 13 instead of the rotation of the feed screw. The slide rod has transverse grooves in its upper surface for receiving samples. The grooves 14 have steeply inclined sides 15 along one side, that is the side of the groove more remote from the inside surface of the blast furnace shaft 4. To assure that the lance penetrates easily into the furnace burden, the free or leading end of the slide rod 13 is shaped as a lance point 16.

While specific embodiments of the invention have been shown and described in detail to illustrate the application of the inventive principles, it will be understood that the invention may be embodied otherwise without departing from such principles.

I claim:

1. Device for removing samples from the burden in a furnace shaft comprising an elongated tubular lance insertable into the furnace shaft, said lance having a first end arranged to be inserted first into the furnace shaft and a second end arranged to be located outwardly from the furnace shaft, said lance having a length between the first end thereof and a point between the first end and the second end so that said lance can be inserted into the furnace shaft with the first end thereof the maximum possible distance inwardly from the inside of the furnace shaft, and an elongated sampler forming an elongated sampling trough slidably positioned within said tubular lance, said sampler having a first end positionable at the first end of said lance when said lance is in inserted into the furnace shaft with the first end thereof the maximum possible distance inwardly from the inside of the furnace shaft, said sampling trough in said sampler having a length from the first end thereof sufficient to receive a sample of the burden within the furnace shaft equal to the length between the first end of said lance and the point between the first end and the second end of said lance, said tubular lance and sampler independently slidably displaceable relative to one another so that said lance and sampler can be inserted as a unit through the furnace shaft wall into the burden in the furnace shaft until the leading first end of said lance is located at a sampling position spaced inwardly from the shaft wall and then retracting said lance toward the shaft wall relative to said sampler for exposing said sampling trough outwardly from the leading first end of said lance for removing samples from the burden and the lance can be withdrawn for completely uncovering said sampling trough within the furnace shaft or in a step-wise operation for uncovering only a partial length of said sampler and then retracting said sampler back into said lance.

2. Device for removing samples from the burden in a furnace shaft comprising a tubular lance insertable into the furnace shaft, said lance having a first end arranged to be inserted first into the furnace shaft and a second end arranged to be located outwardly from the furnace shaft, and a sampler slidably positioned within said tubular lance with said tubular lance and sampler being slidably displaceable relative to one another so that said lance and sampler are insertable as a unit through the furnace shaft wall into the furnace shaft until the leading first end of said lance is located at a sampling position spaced inwardly from the shaft wall and then retracting said lance relative to said sampler for exposing said sampler outwardly from the leading first end of said lance for removing samples from the burden and the lance can be withdrawn for completely uncovering said sampler within the furnace shaft or in a stepwise operation for uncovering only a partial length of said sampler and then retracting said sampler back into said lance, and said sampler is a feed screw rotatable relative to said tubular lance.

3. Device for removing samples from the burden in a furnace shaft comprising a tubular lance insertable into the furnace shaft, said lance having a first end arranged to be inserted first into the furnace shaft and a second end arranged to be located outwardly from the furnace shaft, and a sampler slidably positioned within said tubular lance with said tubular lance and sampler being slidably displaceable relative to one another so that said lance and sampler are insertable as a unit through the furnace shaft wall into the furnace shaft until the leading first end of said lance is located at a sampling position spaced inwardly from the shaft wall and then retracting said lance relative to said sampler for exposing said sampler outwardly from the leading first end of said lance for removing samples from the burden and the lance can be withdrawn for completely uncovering said sampler within the furnace shaft or in a stepwise operation for uncovering only a partial length of said sampler and then retracting said sampler back into said lance, and said sampler comprises an axially elongated slide rod having spaced grooves therein extending transversely of the axial direction of said rod.

4. Device, as set forth in claim 3, wherein said grooves each have a steeply inclined side on the side of said groove more remote from the inside surface of the furnace shaft as said slide rod is inserted into the furnace shaft.

5. Device, as set forth in claim 1, wherein said sampler comprises a sampling trough arranged so that the opening into said trough extends upwardly when said sampler is exposed to the burden within the furnace shaft.

6. Device, as set forth in claims 1, 2, 3 or 4, wherein the end of said sampler arranged to be inserted first into the burden in the furnace shaft is shaped as a lance point.

* * * * *